US006948514B1

(12) United States Patent
Kramer et al.

(10) Patent No.: US 6,948,514 B1
(45) Date of Patent: Sep. 27, 2005

(54) SOLENOID OPERATED SPOOL VALVE WITH BAFFLED DAMPENING RESERVOIR PORT AND METHOD OF MAKING SAME

(75) Inventors: David J. Kramer, Rochester Hills, MI (US); Eugene F. Moody, Waterford, MI (US)

(73) Assignee: Eaton Corporation, Cleveland, OH (US)

( * ) Notice: Subject to any disclaimer, the term of this patent is extended or adjusted under 35 U.S.C. 154(b) by 8 days.

(21) Appl. No.: 10/809,161

(22) Filed: Mar. 25, 2004

(51) Int. Cl.[7] .............................................. F15B 13/044
(52) U.S. Cl. ............................. 137/15.21; 137/625.65; 251/50
(58) Field of Search ........................ 137/15.21, 625.65; 251/50

(56) References Cited

U.S. PATENT DOCUMENTS 6,435,213 B2 * 8/2002 Lou ...................... 137/625.65

* cited by examiner

*Primary Examiner*—Gerald A. Michalsky
(74) *Attorney, Agent, or Firm*—Anna M. Shih; Roger A. Johnston

(57) ABSTRACT

A solenoid operated spool valve has a dampening reservoir formed at one end of the spool and which is ported for immersion in a fluid sump. The reservoir port is oriented vertically above the spool and a cap with an offset port is received over the reservoir port to baffle fluid flow from the reservoir and prevent the reservoir from draining when the port is fluid starved in the sump.

11 Claims, 3 Drawing Sheets

SOLENOID OPERATED SPOOL VALVE WITH BAFFLED DAMPENING RESERVOIR PORT AND METHOD OF MAKING SAME

BACKGROUND OF THE INVENTION

The present invention relates to solenoid operated valves of the spool type which operate to provide a regulated pressure signal to a control signal outlet port by bleeding fluid to an exhaust or sump port from the valving chamber. It has been found that such valves have a tendency to reach instability at certain pressure signal levels and spool positions with respect to the ports; and, it has been found desirable to provide a reservoir or chamber of fluid at the end of the spool to dampen spool movement and minimize the instability.

Such valves have found application in the control of the shifting functions of an automatically shifted speed change power transmission such as utilized in passenger car and light truck motor vehicles. In such transmission applications, the valve body is mounted such that the spool motion is generally along a horizontally oriented axis; and, the spool dampening reservoir supplied with fluid by immersion in the transmission sump. However, during vehicle motion such as rapid acceleration, climbing or descending a hill, deceleration or cornering, the fluid in the sump may be moved away from the dampening reservoir port so as to expose the reservoir port and permit fluid to drain from the dampening reservoir. This occurrence can result in air entering the reservoir such that, upon return of the fluid to the inlet, the reservoir is not filled and dampening of the spool movement is disrupted.

Accordingly, it has been desired to provide a way of preventing the fluid dampening reservoir of a solenoid operated spool valve from becoming starved and fluid draining therefrom such as occurs during movement of the fluid sump.

BRIEF SUMMARY OF THE INVENTION

The present invention provides a baffle in the form of an offset passage for the fluid port to a reservoir disposed at the end of the spool in a solenoid operated spool valve for providing liquid dampening of the spool movement to minimize instability over the range of pressures and spool positions which the valve operates. The valve body includes a means for orienting the dampening reservoir port vertically above the reservoir; and, a cap is received over the end of the valve body with a port which is offset from the dampening reservoir port to baffle passage of fluid through the reservoir port. In the present practice of the invention the fluid port in the reservoir cap is offset axially from the reservoir port with respect to the direction of motion of the spool. The reservoir cap may be assembled thereover by snap-locking engagement. The means for orienting the reservoir inlet preferably comprises a projection formed on the valve body for engaging a recess provided in the solenoid flux collector or upper body portion of the valve.

DETAILED DESCRIPTION OF THE INVENTION

Figure 1:
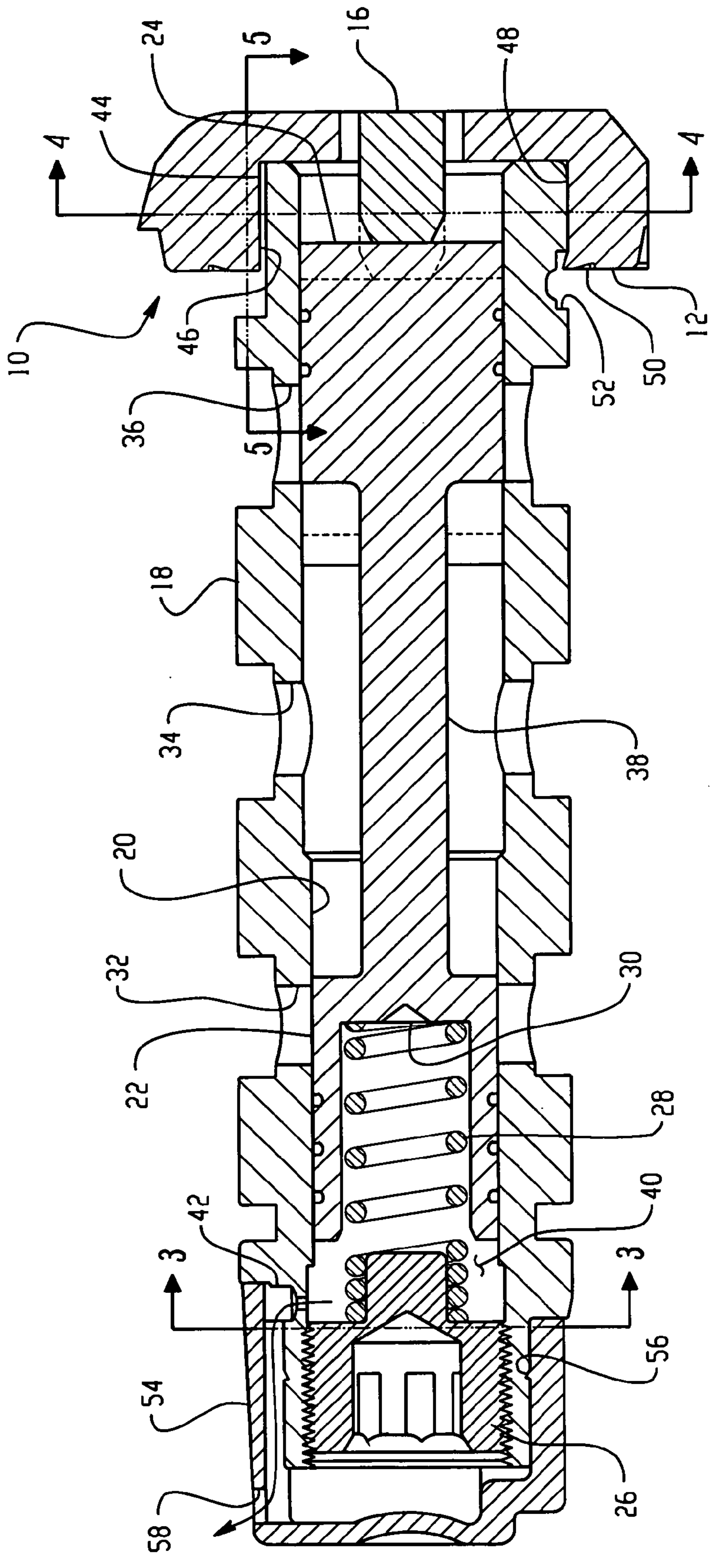
FIG. 1 is a cross-section of the valving portion of the valve assembly of the present invention.
Figure 2:
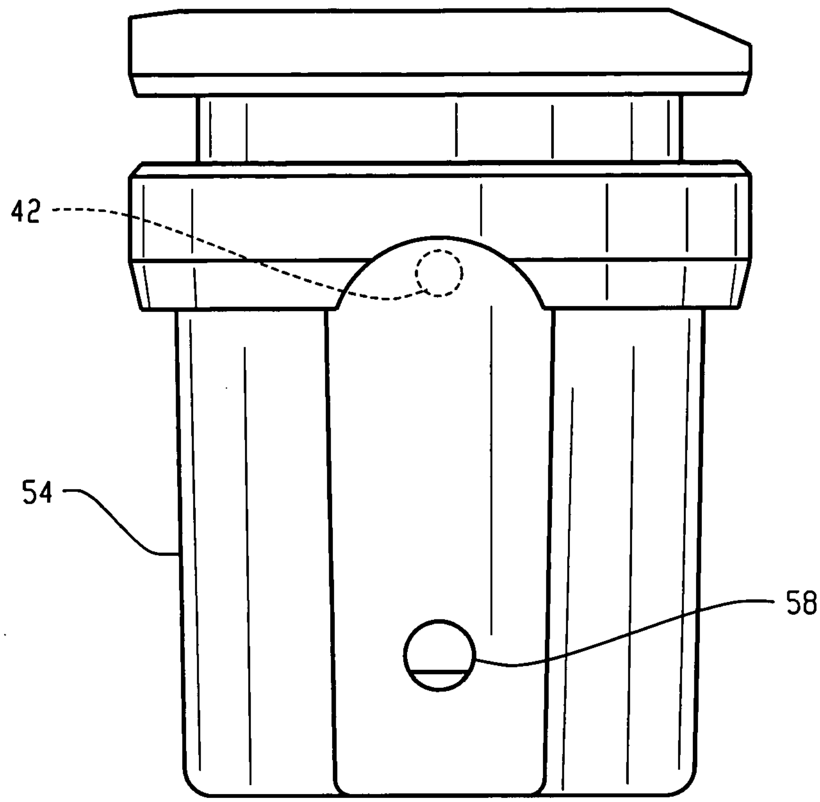
FIG. 2 is a top view of the left-hand portion of the assembly in FIG. 1.
Figure 3:
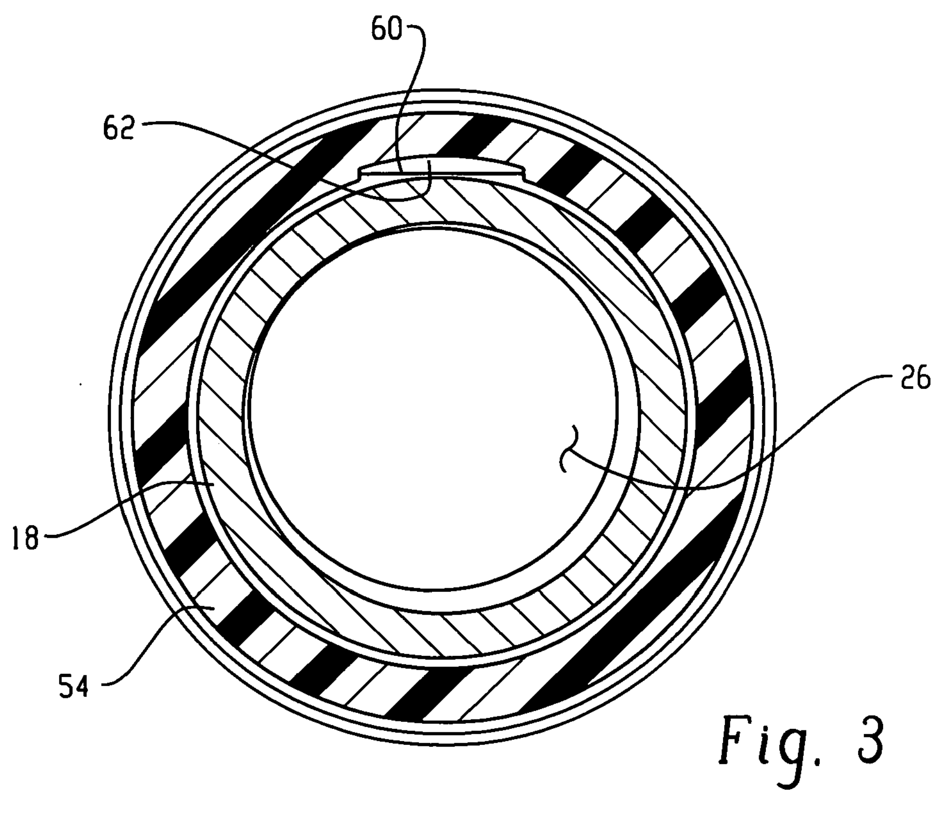
FIG. 3 is a section view taken along section indicating lines 3—3 of FIG. 1.
Figure 4:
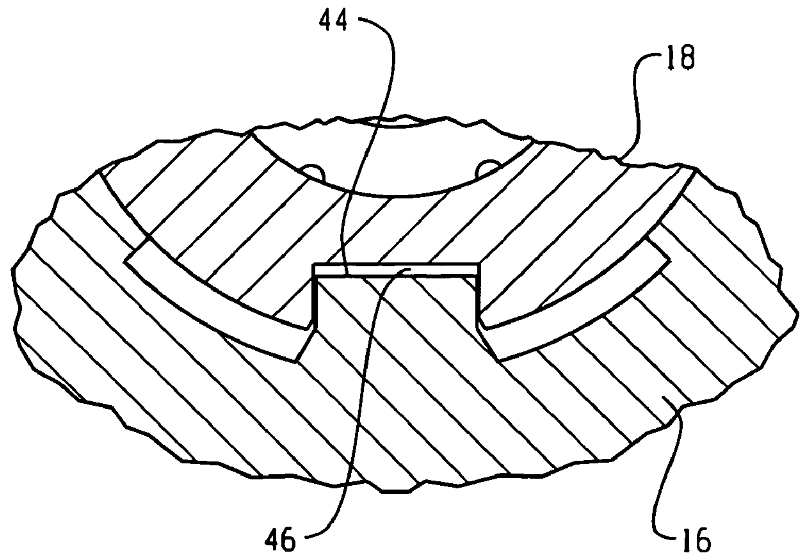
FIG. 4 is a portion of a section view taken along section indicating lines 4—4 of FIG. 1; and, FIG. 5 is a section view taken along section indicating lines 5—5 of FIG. 1.
Figure 5:
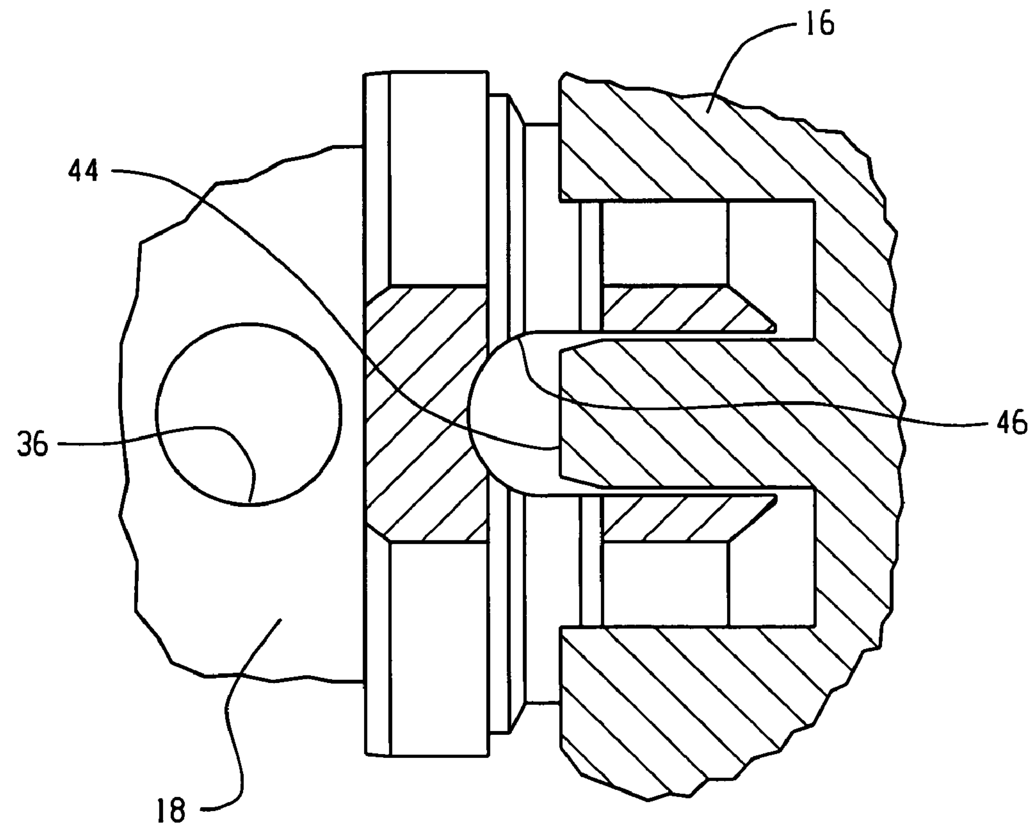

Referring to the drawings, the valve assembly is indicated generally at 10 and includes an upper body portion 12 which may comprise a flux collector of a solenoid coil (not shown) which has an armature/operating rod moved by the armature as denoted by reference numeral 16 extending from the coil. It will be understood that the details of the remaining structure of the solenoid operator have been omitted for the sake of brevity. A lower body portion 18 is connected to the upper body portion 12; and, portion 18 has a valving bore 20 formed therein into which is received, in closely fitting sliding engagement, a valving spool 22 which has one end 24 thereof in contact with one end of the armature or rod 16. It will be understood that such an arrangement, as known in the art, produces movement of the spool in response to energization of the coil; and, movement of the armature 16 and spool 22 is indicated in dashed outline in FIG. 1.

The valving bore 20 is closed at the left end of the lower body portion 18 by a plug 26 threadedly engaging the end of the body. The spool 22 is biased in a rightward direction in FIG. 1 by a spring 28 such that the spool end 24 contacts the end of armature 16. Spring 28 has one end registered against plug 26 and the opposite end registered against a recess 30 formed in the end of the spool 22.

The lower portion 18 of the valve body has formed therein a supply pressure inlet port 32 and a control signal pressure outlet port 34 spaced therefrom along bore 20. In addition, spaced further therefrom in a direction toward the upper body 12 is an exhaust or sump port 36.

Spool 22 has a relieved portion or smaller diameter region 38 formed between inlet port 32 and exhaust port 36. The relieved portion 38 of spool 22 forms valving lands at the opposite ends of the spool for metering flow entering port 32 and flow discharging to sump through port 36, whereupon the desired control pressure is maintained at the control signal outlet port in response to axial movement of the spool 22 by armature 16.

The lower body portion 18 has a reservoir 40 formed therein at the left end of spool 22 which reservoir is formed by the bore 20, plug 26 and the recess 30 formed in the end of the spool. Reservoir 40 has a restrictive port 42 communicating therewith formed in the wall of the body portion 18; and, reservoir 40 is configured to hold a sufficient volume of fluid so as to provide adequate dampening of sudden movement of the spool by forcing the fluid through the restriction of the port 42.

In the present practice of the invention, for horizontally disposed arrangements of the lower valve body 18, the port 42 is arranged to be vertically above the spool 22 by orienting body portion 18 in its attachment to the upper body portion 12 by a projection or rib 44 formed on the right hand end of the lower body portion 18. Rib 44 is received in a recess or groove 46 formed in a bore 48 in the upper body 12 into which is received the right hand end of the lower body portion 18. The lower body portion 18 is retained therein by material deformation denoted by reference numeral 50 of the upper body 12 into a groove 52 formed in the lower body portion 18.

A cap or cover 54 is disposed over the left end of the lower body portion 18 and is preferably snap-locked thereon by engagement of an internal barb 56 provided thereon into a corresponding recess or groove in the lower body. The cover 54 diverts and directs, e.g. baffles, flow from reservoir port 42 to an offset port 58 formed in the cover which may be axially or circumferentially displaced with respect to bore 20 from reservoir port 42. Means are provided for orienting cap 54 and may be in the form of a projection or lug 60 formed thereon which engages a recess 62 formed in the body 18 to orient the port 58 vertically above spool 22 and in alignment with the port 42.

The present invention thus provides a baffled port for the spool dampening fluid reservoir of a solenoid operated spool valve such that a minimum amount of fluid is retained in the dampening reservoir when the reservoir port is starved by removal of the fluid source from the valve.

Although the invention has hereinabove been described with respect to the illustrated embodiments, it will be understood that the invention is capable of modification and variation and is limited only by the following claims.

What is claimed is:

1. In combination with a moveable spool therein a pressure control valve and having a spool dampening chamber comprising:

(a) a valve body, adapted for insertion in a fluid ported cavity in a device to be controlled, with an inlet, a control pressure outlet and an exhaust port communicating with a valving bore therein;

(b) a valve spool disposed in the valving chamber and moveable therein for controlling flow from the inlet to the control pressure outlet and the exhaust outlet;

(c) a fluid filled dampening reservoir formed in the body and having a bleed port therein for limited flow therethrough for providing dampening of said spool movement;

(d) a cap disposed over said bleed port and forming a baffled path for fluid flow through said bleed port for minimizing fluid drain from said reservoir upon said supply port being starved; and, (e) a solenoid operator attached to said body and operable for effecting the spool movement.

2. The combination defined in claim 1, wherein said baffled path includes a port in said cap offset axially with respect to said valving bore from said bleed port.

3. The combination defined in claim 1, wherein said baffled path includes a port in said cap circumferentially aligned and axially offset from said bleed port.

4. The combination defined in claim 1, wherein said body includes means operable for orienting said bleed port vertically on the upper region of said reservoir.

5. The combination defined in claim 1, wherein said cap is formed of plastic material.

6. The combination defined in claim 1, wherein said cap is received on said body in snap-locking engagement.

7. The combination defined in claim 1, wherein said body includes means for orienting the bleed port vertically upon the attachment of the body to the solenoid operator.

8. A method of making a solenoid operated valve comprising:

(a) providing a valve body with a valving bore therein and ported with an inlet and a control pressure outlet;

(b) disposing a valving spool in the valving bore for movement therein;

(c) attaching a solenoid operator to the body and effecting said spool movement;

(d) forming a fluid dampening reservoir in said body and forming a bleed port in said reservoir; and, (e) disposing a cap over said bleed port and forming a vent port and offsetting the vent port from the bleed port and baffling flow through the bleed port.

9. The method defined in claim 8, wherein said step of disposing a cap includes orienting said vent port in line circumferentially with said bleed port.

10. The method defined in claim 8, wherein said step of disposing a cap includes snap-locking the cap to the body.

11. The method defined in claim 8, wherein said step of offsetting includes offsetting in a direction axially with respect to said valving bore.

* * * * *